US012640616B2

(12) United States Patent
Yoshimura

(10) Patent No.: US 12,640,616 B2
(45) Date of Patent: May 26, 2026

(54) ELECTRIC MOTOR CONTROL DEVICE

(71) Applicant: Mitsubishi Electric Corporation, Tokyo (JP)

(72) Inventor: Yoshio Yoshimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 263 days.

(21) Appl. No.: 18/288,742

(22) PCT Filed: May 31, 2021

(86) PCT No.: PCT/JP2021/020644
§ 371 (c)(1),
(2) Date: Oct. 27, 2023

(87) PCT Pub. No.: WO2022/254502
PCT Pub. Date: Dec. 8, 2022

(65) Prior Publication Data
US 2024/0223043 A1     Jul. 4, 2024

(51) Int. Cl.
*H02K 11/33* (2016.01)
*H02K 5/22* (2006.01)
*B62D 5/04* (2006.01)

(52) U.S. Cl.
CPC ............ *H02K 5/225* (2013.01); *H02K 11/33* (2016.01); *B62D 5/046* (2013.01); *H02K 2211/03* (2013.01)

(58) Field of Classification Search
CPC .. H02K 11/0094; H02K 11/225; H02K 11/33; H02K 11/30; H02K 11/20;
(Continued)

(56) References Cited

U.S. PATENT DOCUMENTS

2005/0167183 A1     8/2005  Tominaga et al.
2012/0098365 A1*    4/2012  Yamasaki ............ B62D 5/0406
                                                              310/71
(Continued)

FOREIGN PATENT DOCUMENTS

EP          2 757 665 A1     7/2014
JP          2017-77149 A     4/2017
(Continued)

OTHER PUBLICATIONS

Japanese Office Action issued Mar. 2, 2024 in Application No. 2023-525150.
(Continued)

*Primary Examiner* — Alexander A Singh
(74) *Attorney, Agent, or Firm* — Sughrue Mion, PLLC

(57) ABSTRACT

An electric motor control device includes an electric motor and a controller, and has a mechanical part and electric motor terminals that supply electric power to the mechanical part. The controller that controls a drive of the electric motor has: a unit case, a substrate located between the electric motor and the unit case, wherein the substrate has an electric circuit, a connector that receives electrical power and an input signal from an outside of the electric motor control device, relay components that have relay terminals that connect the electric motor terminals and the electric circuit, and that transmit an electrical connection between the electric motor and the substrate. The unit case fixes the substrate, the connector, and the relay components. The motor terminals extend towards the controller. The motor terminals are connected to the relay terminals of the relay components which are electrically connected to the electric circuit.

7 Claims, 9 Drawing Sheets

(58) Field of Classification Search
CPC ...... H02K 5/225; H02K 2211/03; H02K 3/52;
H02K 3/50; B62D 5/046
USPC .......................................................... 310/71
See application file for complete search history.

(56) References Cited

U.S. PATENT DOCUMENTS

| | | | |
|---|---|---|---|
| 2014/0091683 A1* | 4/2014 | Ito ........................ | B62D 5/0406 |
| | | | 310/68 R |
| 2016/0036306 A1 | 2/2016 | Yamasaki et al. | |
| 2019/0372432 A1 | 12/2019 | Kajihara et al. | |
| 2020/0177060 A1 | 6/2020 | Shimada et al. | |

FOREIGN PATENT DOCUMENTS

| | | | |
|---|---|---|---|
| JP | 2017-103849 A | 6/2017 | |
| JP | 6500952 B2 | 4/2019 | |
| JP | 2020-70732 A | 5/2020 | |
| WO | 2018/096596 A1 | 5/2018 | |
| WO | 2019/038849 A1 | 2/2019 | |

OTHER PUBLICATIONS

Extended European Search Report issued Jun. 24, 2024 in European Application No. 21944013.8.

International Search Report for PCT/JP2021/020644 dated Aug. 17, 2021.

Written Opinion for PCT/JP2021/020644 dated Aug. 17, 2021.

Indian Office Action dated Jan. 30, 2026, issued in Indian application No. 202327077813.

Japanese Office Action issued Apr. 2, 2024 in Application No. 2023-525150.

* cited by examiner

ELECTRIC MOTOR CONTROL DEVICE

CROSS REFERENCE TO RELATED APPLICATIONS

This application is a National Stage of International Application No. PCT/JP2021/020644 filed May 31, 2021.

TECHNICAL FIELD

The present disclosure relates to an electric motor control device.

BACKGROUND ART

Conventionally, an electromechanical integrated control device is known. The electromechanical integrated control device includes an electric motor and a controller to control the electric motor. The controller has a power circuit that supplies electric power to the electric motor, a control circuit, and a substrate to which electronic components are mounted on. Terminals of wiring that extends from the electric motor and a power supply or the like are connected to the substrate. In Patent Document 1, a structure in which terminals of the electric motor are connected to the substrate is disclosed.

CITATION LIST

Patent Document

Patent Document 1: Japanese Patent No. 6500952

SUMMARY OF INVENTION

Problem to be Solved by the Invention

Busbars however, are mounted to the substrate in the device disclosed in Patent Document 1. When the terminals of the electric motor are connected to the busbars by press-fitting, stresses are generated in the substrate, and a problem of damage being caused to electronic components mounted on the substrate exists.

The present disclosure has been made in order to address the problem above, and an object is to provide an electric motor control device capable of reducing stresses generated in a substrate wiring and the electronic components, when terminals of the electric motor and the substrate are being connected.

Means to Solve the Problem

An electric motor control device includes an electric motor and a controller. The electric motor has a mechanical part and electric motor terminals that supply electric power to the mechanical part. The controller that controls a drive of the electric motor, the controller having: a unit case, a substrate that is located between the electric motor and the unit case, wherein the substrate has an electric circuit, a connector that receives electrical power and a signal of the input from an outside of the electric motor control device, relay components that have relay terminals that connect the electric motor terminals and the electric circuit, and that transmit an electrical connection between the electric motor and the substrate. The unit case fixes the substrate, the connector, and the relay components. The motor terminals extend towards the controller from the electric motor. The motor terminals are connected to the relay terminals of the relay components. The relay terminals are electrically connected to the electric circuit.

Effects of the Invention

According to an electric motor control device of the present disclosure, it is possible to reduce stresses that are generated in a substrate, as well as the stresses that are generated in electronic components that are provided on the substrate.

DESCRIPTION OF EMBODIMENTS

Hereinafter, an embodiment of an electric motor control device is explained with reference to FIG. 1 to FIG. 12. Similar reference signs are affixed to configuration portions that are identical or similar to one another in FIG. 1 to FIG. 12.

The electric motor control device according to a present embodiment is an electromechanical integrated type control device of an integrated mechanical part of the electric motor and a controller that controls the electric motor.

In an explanation of the electric motor control device according to the present embodiment, an axial direction that a motor 10 which configures the electric motor control device is simply referred to as the "axial direction". A radial direction of the motor 10 is simply referred to as the "radial direction".

First Embodiment

An electric motor control device 1 according to a first embodiment is explained with reference to FIG. 1 to FIG. 6. For example, the electric motor control device 1 according to the first embodiment is used in an electric power steering device so as to assist a vehicle operator in steering operations. An electric motor control device 1 outputs steering assist torque to the electric power steering device. The electric power steering device is driven based on the steering assist torque which is input from the electric motor control device 1.

<Overall Configuration of Electric Motor Control Device 1>

Figure 1:
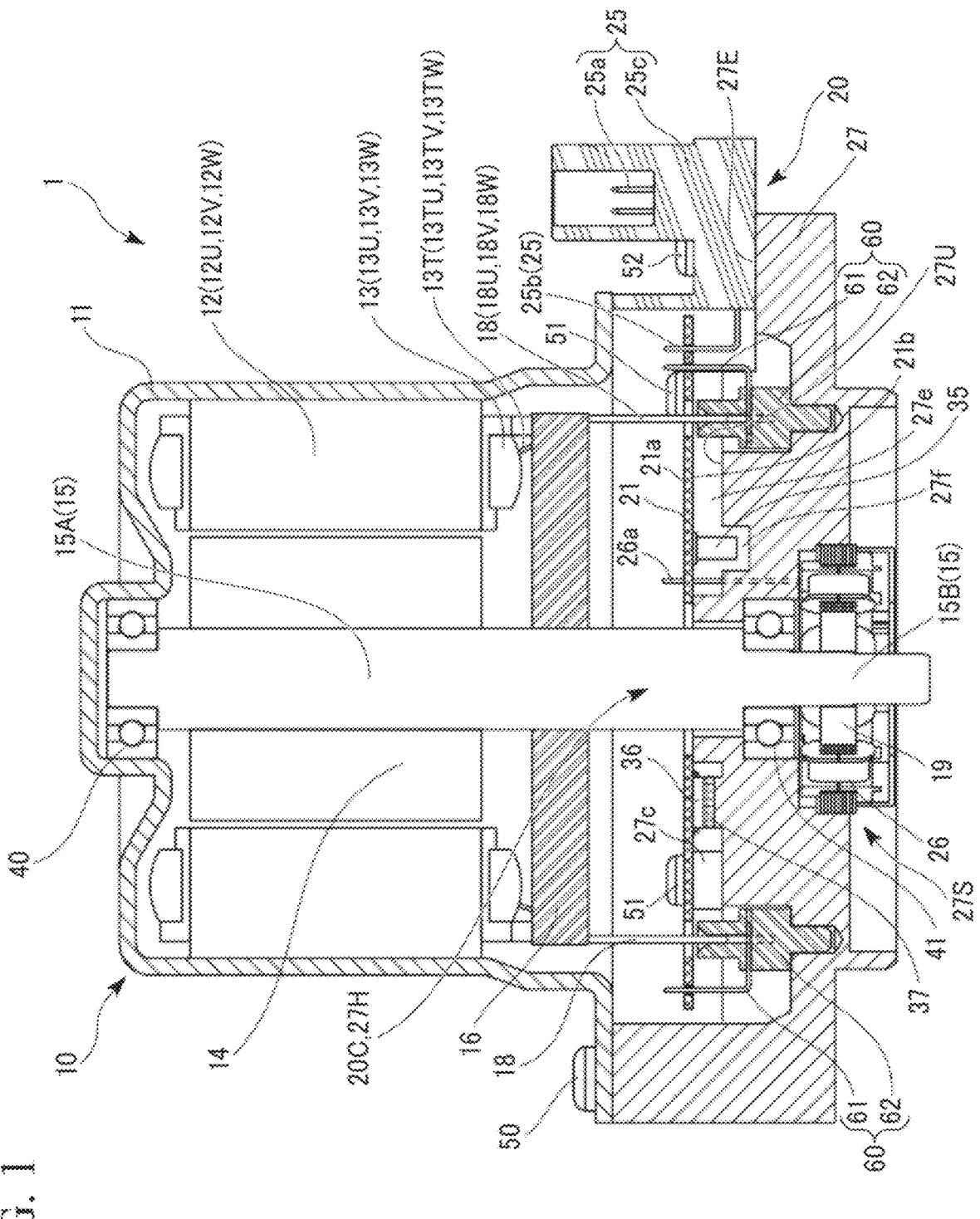
FIG. 1 is a cross-sectional view that shows a configuration of an electric motor control device according to a first embodiment.
Figure 2:
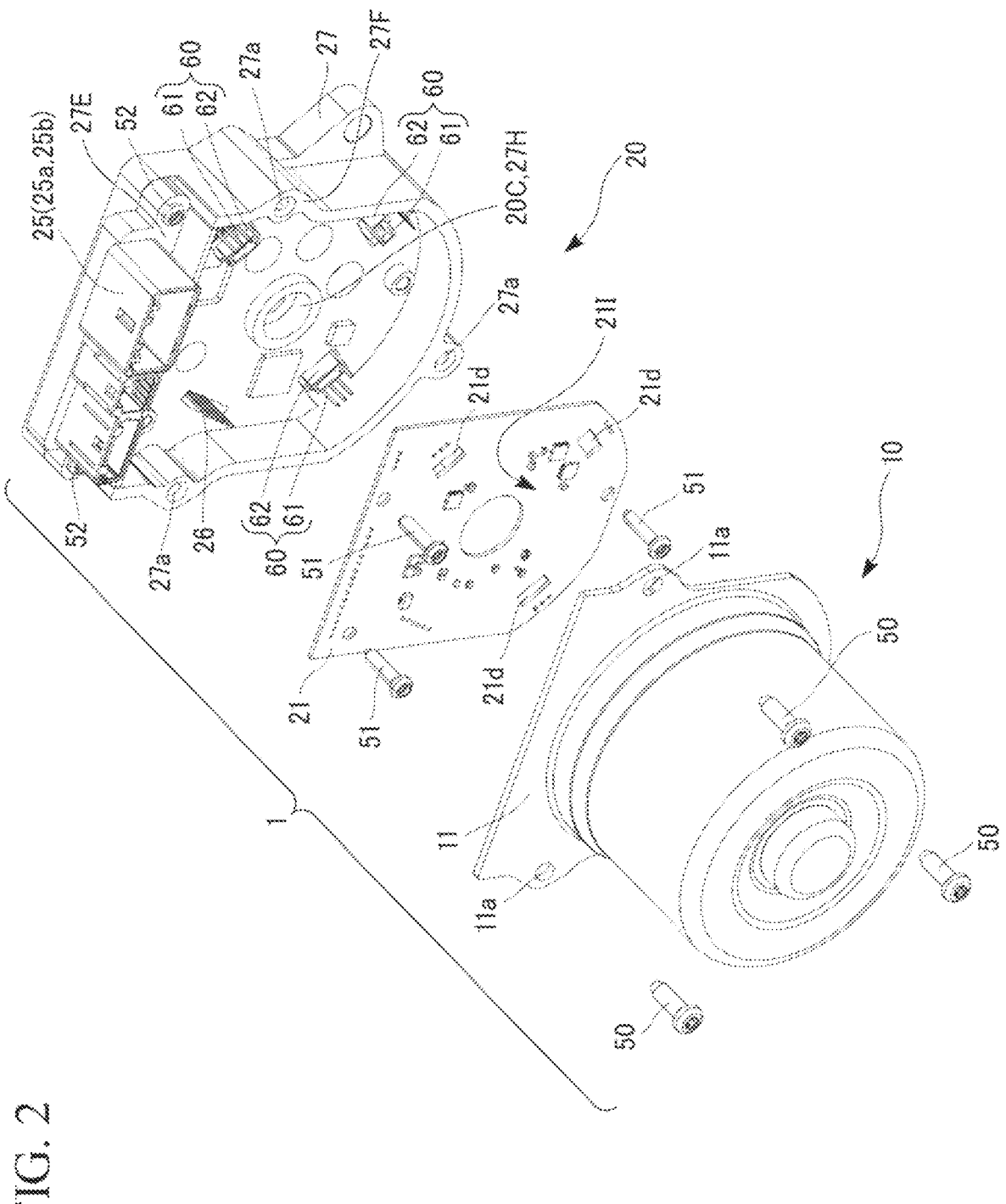
FIG. 2 is an exploded perspective view that shows the electric motor control device according to the first embodiment.

An overall configuration of the electric motor control device 1 is explained with reference to FIG. 1 and FIG. 2. The electric motor control device 1 includes the motor (mechanical part) and a drive controller 20 (controller). The electric motor control device 1 has a structure where the motor 10 and the drive controller 20 are integrally formed.

<Motor 10>

The motor 10 functions as an electric motor. In other words, the motor 10 functions as a rotating electrical machine. The motor 10 is a three phase brushless motor. The motor 10 includes a motor case 11, a plurality of stators 12, windings 13, a rotor 14, a shaft 15, an annular connection ring 16, and motor terminals 18 (electric motor terminals). The plurality of stators 12, the windings 13, the rotor 14, a portion of the shaft 15, the annular connection ring 16 and the motor terminals 18 are housed inside of the motor case 1*i*. The plurality of stators 12, the windings 13, the rotor 14 and the shaft 15 configure the mechanical part of the electric motor.

<Motor Case 11>

The motor case 11 is configured of metallic parts. A material that configures the motor case 11 considers heat dissipatability of the heat that is generated from the motor 10, and machinability of the motor case 11. As an example of the material that configures the motor case 11, iron, and aluminum or the like are preferable.

The motor case 11 has through holes 11*a*. The through holes 11*a* are provided on a grounding portion of the drive controller 120. As is to be mentioned later on, screws 50 are inserted through the through holes 11*a*.

<Stators 12>

The plurality of stators 12 are fixed to an inner wall of the motor case 11.

The plurality of stators 12 are disposed in a circular fashion so as to surround the rotor 14. Each of the plurality of stators 12 faces the rotor 14 through an opening. The windings 13 are wound around each of the plurality of stators 12. Although details are not shown in FIG. 1, a U phase stator 12U, a V phase stator 12V, and a W phase stator 12W that correspond to a U phase, a V phase, and a W phase of a three phase alternating current are disposed in the inner wall of the motor case 11. In the explanation below, there are cases where the "stators 12 of the three phases" are simply referred to as "stators 12".

<Windings 13>

The windings 13 are wound around each of the U phase stator 12U, the V phase stator 12V, and the W phase stator 12W. Specifically, a U phase winding 13U is wound around the U phase stator 12U. A V phase winding 13V is wound around the V phase stator 12V. A W phase winding 13W is wound around the W phase stator 12W. In the explanation below, there are cases where the "windings 13 of the three phases" are simply referred to as "windings 13".

<Annular Connection Ring 16>

An annular connection ring 16 has a circular shape. Terminal portions 13T of each of the U phase winding 13U, the V phase winding 13V, and the W phase winding 13W are each disposed in the vicinity of the annular connection ring 16. Specifically, a terminal portion 13TU of the U phase winding 13U, a terminal portion 13TV of the V phase winding 13V, and a terminal portion 13TW of the W phase winding 13W are connected to the annular connection ring 16.

<Motor Terminals 18>

The motor terminals 18 are for transmitting electric power that drives the motor 10 to the windings 13.

The motor terminals 18 are electrically connected to each of the windings 13 of the three phases, in other words, the U phase winding 13U, the V phase winding 13V and the W phase winding 13W. Specifically, a U phase motor terminal 18U is connected to the U phase winding 13U. A V phase motor terminal 18V is connected to the V phase winding 13V. A W phase motor terminal 18W is connected to the W phase winding 13W. In the explanation below, there are cases where the "motor terminals 18 of the three phases" are simply referred to as "motor terminals 18".

The motor terminals 18 extend from the motor 10 towards the drive controller 20.

<Rotor 14>

The rotor 14 is fixed so as to surround the shaft 15 on the inside of the motor case 11. The rotor 14 is configured of permanent magnets.

<Shaft 15>

The shaft 15 is a rod shaped part. Well-known metallic materials are used as a material of the shaft 15. The center of the shaft 15 and the center of the rotor 14 are concentric, as seen from an axial direction. The shaft 15 extends from the motor 10 towards the drive controller 20, so as to extend in the axial direction. The shaft 15 has a first shaft part 15A and a second shaft part 15B. Out of parts of the shaft 15, the first shaft par 15A is the pan that is housed inside of the motor case 11. Out of parts of the shaft 15, the second shaft part 15B is the part that protrudes from the motor case 11 towards the drive controller 20.

The first shaft part 15A is supported by a first bearing 40 provided inside of the motor case 11.

The second shaft part 15B is supported by a second bearing 41 that is provided in a unit case 27, which is to be mentioned later on. That is, the shaft 15 is rotatably supported by the first bearing 40 and the second bearing 41. As such, it is possible for the shaft 15 and the rotor 14 to rotate. In other words, the second shaft part 15B is an output shaft of the motor 10.

<Drive Controller 20>

The drive controller 20 functions as a controller that controls a drive of the motor 10.

The drive controller 20 mainly includes a substrate 21, a connector 25, the unit case 27, and relay components 60. The substrate 21 and the relay components 60 are each fixed to the unit case 27 in the drive controller 20.

The drive controller 20 is connected to the motor 10 previously mentioned, in the axial direction. The shaft 15 penetrates the drive controller 20 in a central part 20C of the drive controller 20.

<Substrate 21>

The substrate 21 is located between the motor 10 and the unit case 27.

An example of the substrate 21 is a well-known circuit board having a printed substrate. The type of the substrate 21 is not limited in the first embodiment.

The substrate 21 has a vertical surface with respect to the axial direction. In the explanation below, regarding surfaces of the substrate 21, a surface of the substrate 21 that faces the motor 10 (motor facing surface) is referred to as a "first surface 21a". The surface of the substrate 21 that faces the drive controller 20 (drive controller facing surface) is referred to as a "second surface 21b".

The substrate 21 is fixed to substrate support parts 27c of the unit case 27, to be mentioned later on, by screws 51. It is preferable to fix the substrate 21 and the substrate support parts 27c at multiple locations around the substrate 21. In such a case, it is possible to prevent hovering away of the substrate 21 from the unit case 27 that results during assembly of the substrate 21 to the unit case 27.

A CPU 36 (Central Processing Unit) and capacitors 35 are mounted on the second surface 21b.

Connection terminals that are electrically connected to the substrate 21 are formed on the second surface 21b. Specifically, connection terminals that are connected to relay connection parts 61c (substrate connection part) of the relay terminals 61 to be mentioned later on, connection terminals that are connected to connector connection parts 25b (substrate connection part) of the connector 25 to be mentioned later on, and connection terminals that are connected to sensor connection parts 26a (substrate connection part) of a rotation sensor 26 to be mentioned later on are formed on the second surface 21b.

Substrate through holes 21d through which the motor terminals 18 are inserted through are formed in the substrate 21. The substrate through holes 21d are formed in locations that correspond to the motor terminals 18. Electronic components are disposed in a region 211 that is located in the inside radial direction more than the three substrate through holes 21d.

Figure 5:
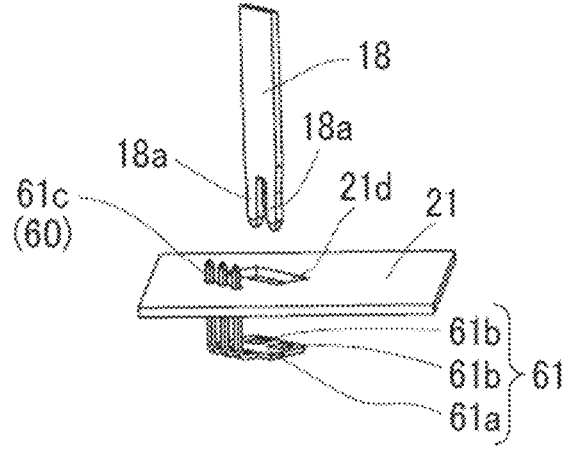
FIG. 5 is a schematic perspective view that shows a condition of a state of the motor terminals prior to connecting the motor terminals to the relay terminals, and is a view that abbreviates a socket and a unit case that are shown in FIG. 3.

Three holes are formed in a location that is on an outside radial direction of each of the substrate through holes 21d. The three holes are disposed along the longitudinal direction of the substrate through holes 21d, and are formed adjacent to one of the substrate through holes 21d. The relay connection parts 61c which are shown in FIG. 5 to be mentioned later on, penetrate each of the three holes, and are connected to the substrate 21 by soldering <Unit Case 27>

The unit case 27 includes the substrate support parts 27c, a holding part 27S, the rotation sensor 26, and a rotation sensor rotor 19. The unit case 27 fixes the substrate 21, the connector 25, and the relay components 60.

The unit case 27 is configured from metallic parts. A material that configures the unit case 27 considers heat dissipatability of the heat that is generated from the electric motor control device 1, and machinability of the unit case 27. As a material that configures the unit case 27, for example, aluminum or the like are preferable.

The substrate support parts 27c are parts to which the screws 51 that are inserted through the through holes of the substrate 21 are screwed into. The substrate 21 and the unit case 27 are fixed by the screws 51 in the substrate support parts 27c.

The holding part 27S is a part that holds the rotation sensor 26 and the rotation sensor rotor 19. The rotation sensor 26 is fixed to the unit case 27 by the holding part 27S.

For example, the rotation sensor 26 is a resolver. A resolver coil is housed inside the rotation sensor 26. The rotation sensor 26 has a sensor connection part 26a. The sensor connection pan 26a is a terminal that is connected to the substrate 21 by soldering or the like.

The rotation sensor rotor 19 is installed on the second shaft part 15B that is supported by the second bearing 41. The rotation sensor rotor 19 faces the rotation sensor 26. When the motor 10 is driven, the shaft 15 rotates along, and the rotation sensor rotor 19 rotates with the second shaft part 15B. As such, the rotation sensor 26 detects the rotation angle of the shaft 15.

The unit case 27 has a hole 2714 provided at, a location corresponding to the central part 20C of the drive controller 20. It is possible for the second shaft part 15B of the shaft 15 to penetrate through the hole 27H. A connector fixing part 27E' is formed on a portion of an outer circumference of the unit case 27. The connector fixing part 27B is a partly cut off portion of the part of the outer circumference of the unit case 27. The connector 25 is installed onto the connector fixing part 27E.

Female thread parts 27a are formed on an outer periphery 27F of the unit case 27. The screws 50 that are inserted through the through holes 11a of the motor case 11 are screwed into the female thread parts 27a. By screwing the screws 50 into the female thread parts 27a, the motor case 11 is fastened to the unit case 27, and is fixed to the unit case 27.

A profile of the drive controller 20 is formed by combining a profile of a metallic unit case 27 and a profile of a resin part 25c of the connector 25. The unit case 27 has a function of covering the drive controller 20. It is possible to refer to the unit case 27 as a "housing".

In the unit case 27, portions other than the portions which have the substrate support pans 27c formed have a shorter height than a height of the substrate support parts 27c in the axial direction. For such a reason, a gap 27e is formed between a top surface 27U of the unit case 27, and the second surface 21b of the substrate 21. The unit case 27 has socket seating surfaces 27h and socket press-fit holes 27g that are mentioned later on. The socket seating, surfaces 27h are located on a lower surface of a recess part 27B that is formed on the top surface 27U. The socket press-fit holes 27g are holes that are provided in the socket seating surfaces 27h.

A heat dissipating part 37 having a high thermal conductivity is disposed in the gap 27e. The heat dissipating pan 37 dissipates heat that the CPU 36 generates to the unit case 27. Recessed parts 27f are formed on locations of the top surface 271 that corresponds to the capacitors 35 mounted on the second surface 21b. The heat dissipating part 37 is disposed in the gap 27e, and it is possible to dissipate the heat generated from the capacitors 35 to the unit case 27.

<Relay Components 60>

The relay components 60 are motor connection parts that connect the motor terminals 18 and the substrate 21.

In other words, the relay components 60 are relay components that relay an electrical connection between the motor 10 and the drive controller 20.

The relay components 60 are configured from the relay terminals 61 and sockets 62. The sockets 62 are resin parts.

The relay terminals 61 are connected to the motor terminals 18 previously mentioned. As is mentioned later on, the relay terminals 61 have the relay connection parts 61*c*. The relay terminals 61 connect the motor terminals 18 and a circuit board of substrate 21.

The sockets 62 are fixed at a location closer to the motor 10 than to the substrate 21.

As a modification example, it is possible to fix the sockets 62 to the unit case 27 in a location on an opposite side of the motor 10 with respect to the substrate 21.

The relay terminals 61 are electrically connected to each of the three phase motor terminals 18, in other words, the U phase motor terminal 18U, the V phase motor terminal 18V, and the W phase motor terminal 18W. Specifically, the U phase motor terminal 18U is connected to a U phase relay terminal 61U. The V phase motor terminal 18V is connected to a V phase relay terminal 61V. The W phase motor terminal 18W is connected to a W phase relay terminal 61W. In the explanation below, there is a case where the relay terminals 61 of the three phases are simply referred to as the "relay terminals 61".

There is a case where the relay components that have the U phase relay terminal 61U are referred to as the "U phase relay components". There is a case where the relay components that have the V phase relay terminal 61V are referred to as the "V phase relay components" There is a case where the relay components that have the W phase relay terminal 61W are referred to as the "W phase relay components". In the explanation below, there is a case where the relay components 60 of the three phases are simply referred to as the "relay components 60".

The motor terminals 18 that are inserted through the substrate through holes 21*d* are connected to the relay terminals 61 by press-fitting.

The relay terminals 61 are integrally formed with the sockets 62. The sockets 62 are fixed to the unit case 27. The relay terminals 61 are electrically connected to the substrate 21 by soldering or the like.

In other words, the motor terminals 18 are connected to the substrate 21 through the relay terminals 61 of the relay components 60. As such, the drive controller 20 is electrically connected to the motor 10 through the relay components 60.

<Connector 25>

The connector 25 is a part that is exposed to the outside of the electric motor control device 1.

The connector 25 receives electric power and a signal that are input from the outside of the electric motor control device 1.

The connector 25 has power terminals 25*a* (power terminals), signal terminals that are not shown, the connector connection parts 25*b*, and the resin part 25*c*. The power terminals 25*a* and the signal terminals are housed inside of the connector 25. The power terminals 25*a* are terminals that are connected to a battery installed in a vehicle. The signal terminals are terminals that are connected to various information detecting sensors of the electric motor control device 1.

The connector 25 is fixed to the unit case 27 by screws 52. The connector connection parts 25*b* of the connector 25 are electrically connected to the substrate 21 by soldering or the like.

A manufacturing method of the previously mentioned electric motor control device 1 is explained below.

First, the connector 25 and the relay components 60 are assembled to the unit case 27. After that, the substrate 21 is assembled to the unit case 27. As such, the drive controller

20 is obtained. Next the drive controller 20 and the motor 10 are assembled to one another. At such time, the motor terminals 18 are connected to the substrate 21 through the relay terminals 61.

<Terminal Connection Structures>

Next, terminal connection structures in the electric motor control device 1 are explained by referencing FIG. 3 to FIG. 6. In such terminal connection structures, the motor terminals 18 pulled out front the windings 13 are connected to the relay terminals 61.

Figure 3:
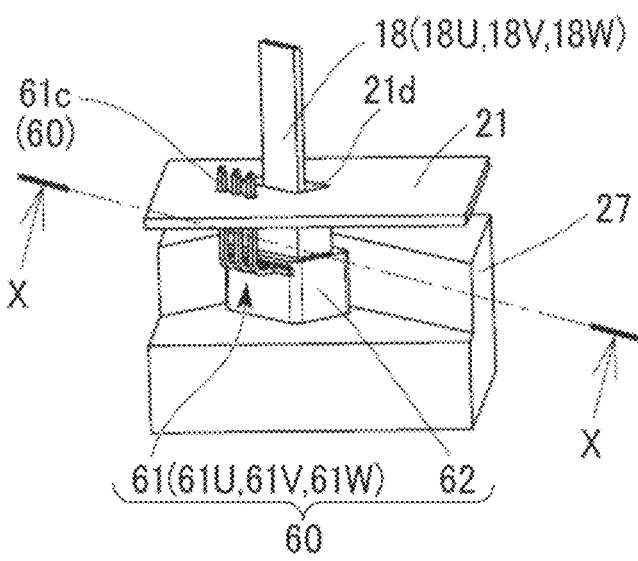
FIG. 3 is a schematic perspective view that shows a connection portion of motor terminals and relay components of the electric motor control device according to the first embodiment.
Figure 4:
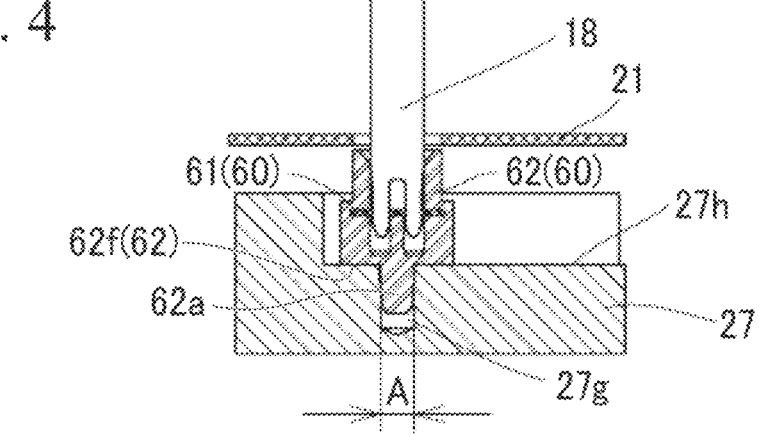
FIG. 4 is a cross-sectional view taken along a cross-section line X-X shown in FIG. 3.

In FIG. 3 to FIG. 5, a part where the substrate 21, the motor terminals 18, the relay terminals 61, and the sockets 62 are provided is shown, and an overall shape of the substrate 21 and the unit case 27 is simplified.

As shown in FIG. 3 to FIG. 6, the relay components 60 are configured from the relay terminals 61 and the sockets 62. The relay terminals 61 and the sockets 62 are integrally formed. As examples of methods for integrally forming the relay terminals 61 and the sockets 62, an outsert molding method or an insert molding method may be mentioned. By press-fitting the relay components 60 into the unit case 27, the relay components 60 and the unit case 27 are assembled.

Figure 6:
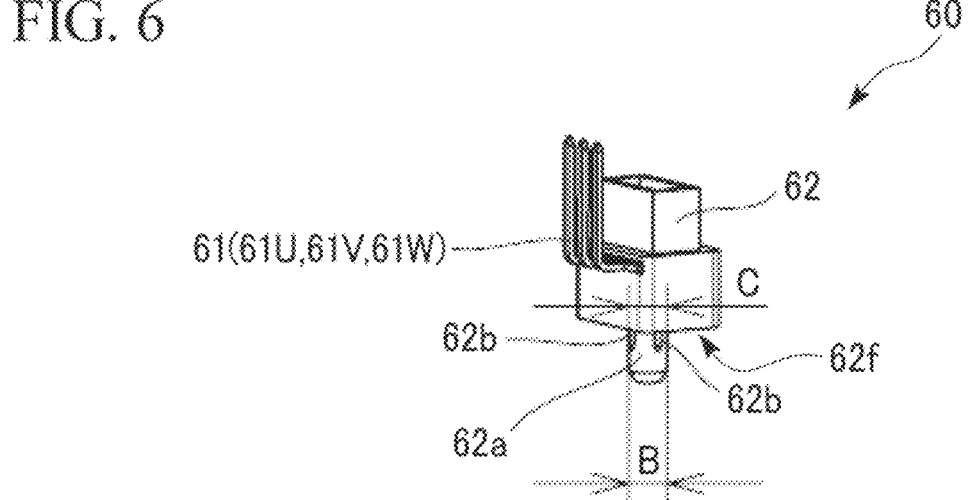
FIG. 6 is a perspective view that shows the relay components that the electric motor control device is configured from, according to the first embodiment.

As shown in FIG. 4 and FIG. 6, the sockets 62 for example, have cylindrical parts 62*a* and a plurality of ribs 62*h*. The sockets 62 have facing surfaces 62*f* that face socket seating surfaces 27*h*. The cylindrical parts 62*a* protrude from the facing surface 62*f*. The plurality of ribs 62*b* are provided around the cylindrical parts 62*a*. The ribs 62*b* protrude from the surface of the cylindrical parts 62*a* towards an outside radial direction of the cylindrical parts 62*a*. As shown in an example of FIG. 6, the ribs 62*b* extend along a direction in which the cylindrical parts 62*a* protrude from the facing surface 62*f*.

In the example shown in FIG. 6, although two of the ribs 62*b* am formed around the cylindrical parts 62*a*, a number of the ribs 62*b* is not limited thereto. It is possible to have a plurality of ribs 62*b* provided around the cylindrical parts 62*a* at equal intervals.

A shape of the ribs 62*b* is not limited to the shape shown in in FIG. 6. For example, the ribs 62*b* may be a plurality of dots (dotted parts) that protrude from the surface of the cylindrical parts 62*a*. The ribs 62*b* may be an annularly shaped ring (annular part) that is concentric with the cylindrical parts 62*a*, along with protruding from the surface of the cylindrical parts 62*a*. The ribs 62*b* may extend along a direction that intersects a direction in which the cylindrical parts 62*a* extends from the facing surface 62*f*. The ribs 62*b* may be formed in a spiral shape on the surface of the cylindrical parts 62*a*. In other words, the ribs 62*b* may have a male thread shape that is formed on the surface of the cylindrical parts 62*a*.

If the shapes of the cylindrical pails 62*a* and the ribs 62*b* are elastically deformable when the sockets 62 are press-fitted into the socket press-fit holes 27*g*, the number of the ribs 62*b*, the disposition of the ribs 62*b*, and the shapes of the ribs 62*b* are not limited.

As shown in FIG. 4, the unit case 27 has the socket press-fit holes 27*g*. Although in FIG. 4 one socket press-fit holes 27*g* are shown, the socket press-fit holes 27*g* are provided in three locations in the unit case 27, corresponding to the three phases of the relay components 60. In other words, U phase socket press-fit holes 27*g*. V phase socket press-fit holes 27*g*, and W phase socket press-fit holes 27*g* are provided in the unit case 27.

A radius A of the socket press-fit holes 27*g* is larger than a radius B (A>B) of the cylindrical parts 62*a* of the sockets 62. The radius A of the socket press-fit holes 27*g* is smaller than a width C (C>A) that includes the cylindrical parts 62*a* of the sockets 62 and the ribs 62*b*. The phrase "a width C that includes the cylindrical parts 62*a* of the sockets 62 and the ribs 62*b*" means a width in the radial direction of the cylindrical parts 62*a*, in a cross-section of the cylindrical pans 62*a* that is parallel to the facing surface 62*f*. Two points that govern a distance of the width C may be the distance between two end surfaces of the ribs 62*b*, or the distance between one end surface of the ribs 62*b* and the surface of the cylindrical parts 62*a*.

The relay components 60 is press-fitted into the unit case 27 having the previously mentioned shape. When press-fitting the relay components 60 into the unit ease 27, first, the cylindrical parts 62*a* in which the ribs 62*b* are formed are made to face the socket press-fit holes 27*g*. The cylindrical parts 62*a* and the ribs 62*b* are inserted into the socket press-fit holes 27*g*. Since the radius A is smaller than the width C, the ribs 62*b* are pressed in towards an inside radial direction of the socket press-fit holes 27*g* by an inner wall of the socket press-fit holes 27*g*. The relay components 60 are press-fit into the unit case 27 as the cylindrical parts 62*a* and the ribs 62*b* elastically deform due to a pressing force applied to the ribs 62*b*, or due to the pressing force applied to both the cylindrical parts 62*a* and the ribs 62*b*. The relay components 60 are press-fitted into the unit case 27 in the axial direction at least until a portion of the facing surface 62*f* of the sockets 62 contacts the socket seating surfaces 27*h* of the unit case 27. The U phase, V phase, and W phase of the relay components 60 are each press-fitted into the socket press-fit holes 27*g* of the U phase, the V phase, and the W phase.

"Fixing the sockets 62 by press-fitting into the unit case 27" means to have the cylindrical parts 62*a* of the sockets 62 and the ribs 62*b* elastically deform on an inside of the socket press-fit holes 27*g*. The cylindrical parts 62*a* are fixed in the socket press-fit holes 27*g* due to the restoring force of the cylindrical parts 62*a* and the ribs 62*b*.

When it is possible to press-fit the sockets 62 into the socket press-fit holes 27*g* of the unit case 27, the shape of the sockets 62 is not limited to the shape shown in the previously mentioned embodiment.

As a modification example, an adhesive may be applied between the relay components 60 and the socket seating surfaces 27*h*, therefore fixing the relay components 60 to the unit case 27. As such, it is possible to fix the relay components 60 and the unit ca e 27 by an adhesion force of the adhesive, and not only fixing by the press-fitting of the relay components 60 and the unit case 27 previously mentioned. As a type of the adhesive, a well-known adhesive material is used.

As a modification example, the relay components 60 and the unit case 27 do not need to be fixed by press-fitting. In such a case, the relay components 60 and the unit case 27 are fixed due to the adhesion force of the adhesive. Even in such a case, a sufficient fixing force to fix the relay components 60 and the unit case 27 is obtainable.

The relay terminals 61 are formed of a bent sheet metal such as copper or the like.

As shown in FIG. 5, flat surface parts 61*a* of the relay terminals 61 are disposed so vertically with respect to the axial direction. The flat surface parts 61*a* have through holes 61*b* in two locations so as to connect the motor terminals 18 and the relay terminals 61.

A tip of tips 18*a* of the motor terminals 18 has a shape where the tip of the tips 18*a* of the motor terminals 18 is split into two. In other words, the tips 18*a* of the motor terminals 18 have a forked shape. When the tips 18*a* of the motor terminals 18 are inserted through the through holes 61*b* of the relay terminals 61 by press-fitting, the tips 18*a* of the motor terminals 18 expand in the through holes 61*b*, and it is possible to elastically connect the tips 18*a* and the through holes 61*b*. From the above, the motor terminals 18 and the relay terminals 61 are electrically connected.

The shapes of the motor terminals 18 and the relay terminals 61 each are not limited to the shapes of the motor terminals 18 and the relay terminals 61 shown in the previously mentioned embodiments, when it is possible to electrically connect the motor terminals 18 and the relay terminals 61 by press-fitting the motor terminals 18 with respect to the relay terminals 61.

The relay connection parts 61*c* of the relay terminals 61 extend in the vertical direction with respect to the flat surface parts 61*a* in which the motor terminals 18 are inserted through. In other words, the relay connection parts 61*c* and the flat surface parts 61*a* form an L shape. The relay connection pans 61*c* have a shape where the relay terminals 61 are split into three parts. In other words, the relay connection pans 61*c* have a three pronged fork shape. In other words, the relay connection parts 61*c* have three terminals. The relay connection parts 61*c* are connected to the substrate 21 by soldering or the like. The terminals of the relay connection parts 61*c* are not limited to three. The number of terminals of the relay connection parts 61*c* may be two, or may be greater than or equal to four.

As shown in FIG. 5, the relay connection parts 61*c* go through the substrate through holes 21*d*. It is preferable that the relay connection parts 61*c* which go through the substrate through holes 21*d* be disposed on the outside radial direction of the substrate 21. In such a case, it is possible to dispose the electronic components in the region 211 of the substrate 21 that is located in the inside radial direction more than the substrate through holes 21*d*.

In the first embodiment having the configurations mentioned above, each of the substrate 21 and the relay components 60 is fixed to the unit case 27. According to such configurations, the motor terminals 18 are not directly connected to the substrate 21. The motor terminals 18 are electrically connected to the substrate 21 through the relay components 60. Therefore, it is possible reduce stresses that are generated in the substrate 21 which result from the motor terminals being directly connected to the substrate.

By disposing the relay connection parts 61*c* on the outside radial direction of the substrate through holes 21*d* of the substrate 21, it becomes easier to dispose electronic components in the region 211 that is located in the inside radial direction of the substrate through holes 21*d* in the substrate 21. By disposing the electronic components in the region 211, even in a case where stresses are generated in the substrate 21 and the connection terminals, it is possible to reduce a transmission of stress from the substrate through holes 21*d* to the electronic components.

The relay connection parts 61*c* of the relay terminals 61 have a plurality of divided terminals. In the first embodiment, the relay connection parts 61*c* have three terminals. In a condition of constant cross-sectional areas, it is possible to reduce a rigidity of the relay connection parts 61*c* in the case where the relay connection parts 61*c* have a plurality of terminals, when comparing a case where the relay connection parts 61*c* have one terminal to a case where the relay connection parts 61*c* have a plurality of terminals. For such reason, in a case where stresses are generated in the plurality of terminals of the relay connection parts 61*c*, it is possible to reduce the transmission of stress to the substrate 21. Also, when the relay connection parts 61*c* have a plurality of terminals, it is possible to continuously maintain the electrical connection even in a case where one of the plurality of terminals is ruptured.

In the first embodiment, the connection terminals to which the relay connection parts 61*c* are connected to, the connection terminals to which the connector connection parts 25*b* are connected to, and the connection terminals to which the sensor connection part 26*a* is connected to, are formed on the second surface 21*b* of the substrate 21. In other words, the aforementioned connection terminals are not formed on the first surface 21*a*.

For such a reason, it is possible to connect the sensor connection part 26*a*, the connector connection parts 25*b*, and the relay connection parts 61*c* to the second surface 21*b* of the substrate 21 only by soldering or the like. It is possible to conduct the aforementioned connection while the substrate 21 is fixed, without the need to invert the first surface 21*a* and the second surface 21*b*. It is possible to collectively connect the sensor connection part 26*a*, the connector connection parts 25*b*, and the relay connection parts 61*c* to the substrate 21 in a single connection process, and it is possible to efficiently produce the electric motor control device 1.

Next, each of a plurality of embodiments that differ from the first embodiment mentioned above is explained.

In the explanation below, components similar to components of the first embodiment have the same reference signs affixed thereto, and explanations thereof are omitted.

Second Embodiment

Figure 7:
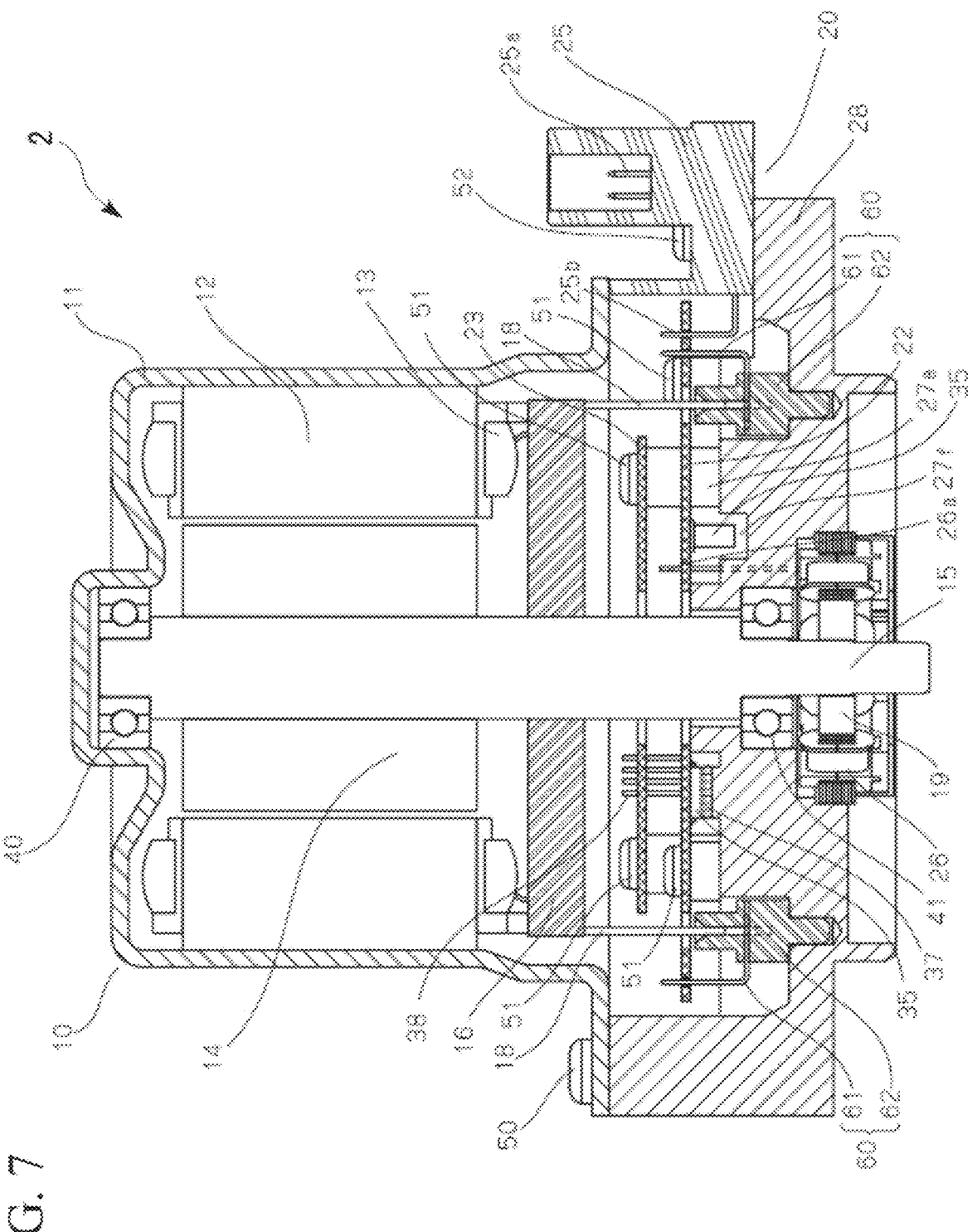
FIG. 7 is a cross-sectional view that shows a configuration of the electric motor control device according to a second embodiment.

Terminal connection structures of an electric motor control device according to a second embodiment are explained with reference to FIG. 7.

The second embodiment and the first embodiment are similar with regards to a method of fixing the relay components 60 to a unit case. The second embodiment and the first embodiment differ with regards to a shape and configuration of a substrate, along with a structure of fixing the unit case to the substrate. Points of difference between the first embodiment and the second embodiment are emphasized in the explanation below.

The substrate included in an electric motor control device 2 according to the second embodiment differs from the substrate 21 mentioned above in that the substrate is configured of a plurality of substrates.

Specifically, the electric motor control device 2 includes a power substrate 22 and a control substrate 23. The power substrate 22 has an inverter circuit that supplies electric power to the motor 10. The control substrate 23 has a control circuit that controls the drive of the motor 10. To configure each of the inverter circuit and the control circuit, well-known circuit configurations may be used.

A unit case 28 corresponds to the unit case 27 explained in the first embodiment.

The power substrate 22 and the control substrate 23 are electrically connected to one another by connection terminals 38 or the like. For example, the power substrate 22 and the unit case 28 are disposed so as to face one another. The control substrate 23 and the motor 10 are disposed so as to face one another. The power substrate 22 and the control substrate 23 are disposed vertically with respect to the motor terminals 18. Each of the power substrate 22 and the control substrate 23 are fixed to the unit case 28 by screws 51.

It is also possible to change the dispositions of the power substrate 22 and the control substrate 23. In other words, the power substrate 22 may be disposed so as to face the motor 10. The control substrate 23 may be disposed so as to face the unit case 28.

The relay components 60 connected to the motor terminals 18 are disposed between the power substrate 22 and the unit case 28. The relay connection parts 61*c* are connected to the power substrate 22.

In a configuration of a single substrate that includes an overlap of the functions of the power substrate 22 and the control substrate 23, a surface area of the substrate becomes large, and a limit exists as to how much a profile size of the substrate may be made smaller. In other words, to integrate the inverter circuit and the control circuit onto a single substrate, the surface area of the substrate is increased.

With respect to the above, same or similar effects as the embodiment mentioned above are obtainable according to the second embodiment. Since the power substrate 22 and the control substrate 23 each have differing functions, there is no need to integrate the inverter circuit and the control circuit onto a single substrate. Therefore, it is possible to reduce the profile size of a single substrate, when compared to a configuration where the inverter circuit and the control circuit are integrated onto a single substrate. By disposing the power substrate 22 and the control substrate 23 so as to face one another in a parallel fashion in the axial direction, it is possible to downsize the profile size of the radial direction of the drive controller 20.

Third Embodiment

Figure 8:
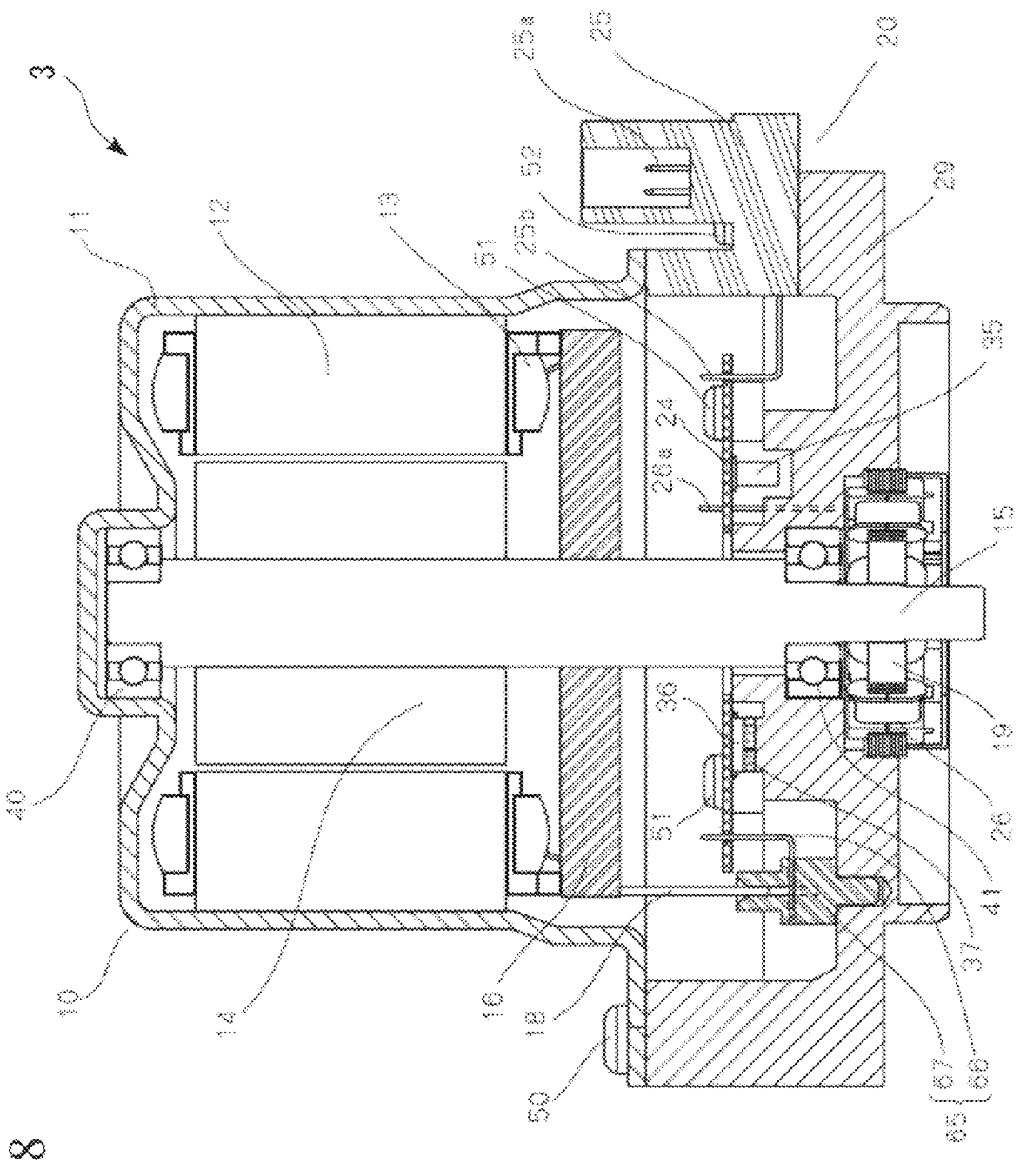
FIG. 8 is a cross-sectional view that shows a configuration of the electric motor control device according to a third embodiment.

Terminal connection structures of an electric motor control device according to a third embodiment are explained with reference to FIG. 8.

The third embodiment and the first embodiment are similar with regards to a method of fixing relay components to a unit case. The third embodiment and the first embodiment differ with regards to a disposition of the relay components and a substrate, and shapes of sockets, relay terminals, the substrate, and the unit case. Points of difference between the first embodiment and the third embodiment are emphasized in the explanation below.

In an electric motor control device 3 according to the third embodiment, relay components 65 correspond to the relay components 60 explained in the first embodiment. A substrate 24 corresponds to the substrate 21 explained in the first embodiment. A unit case 29 corresponds to the unit case 27 explained in the first embodiment.

The relay components 65 are disposed to an outside of the radial direction more than an outer circumference of the substrate 24. The substrate 24 and the relay components 65 are fixed to the unit case 29.

The relay components 65 are configured of relay terminals 66 and sockets 67. The relay terminals 66 correspond to the relay terminals 61 explained in the first embodiment. The sockets 67 correspond to the sockets 62 explained in the first embodiment. The connection structures of the motor terminals 18 and the relay terminals 66 are similar to the connection structures of the motor terminals 18 and the relay terminals 66 in the first embodiment. Relay connection parts that connect the substrate 24 and the relay terminals 66 are disposed to the inside radial direction more than the motor terminals 18. The relay terminals 66 are connected to the substrate 24, similarly to the relay connection parts 61*c* that are shown in FIG. 3 to FIG. 6.

The substrate 24 does not have substrate through holes through which the motor terminals 18 are inserted through. The motor terminals 18 are not inserted through the substrate 24.

With respect to the above, same or similar effects as the embodiments mentioned above are obtainable according to the third embodiment. Since the motor terminals 18 are not inserted through the substrate 24, there is no need to form through holes in the substrate 24. For such a reason, a region to which components of the substrate 24 are mounted on increases.

Fourth Embodiment

Figure 9:
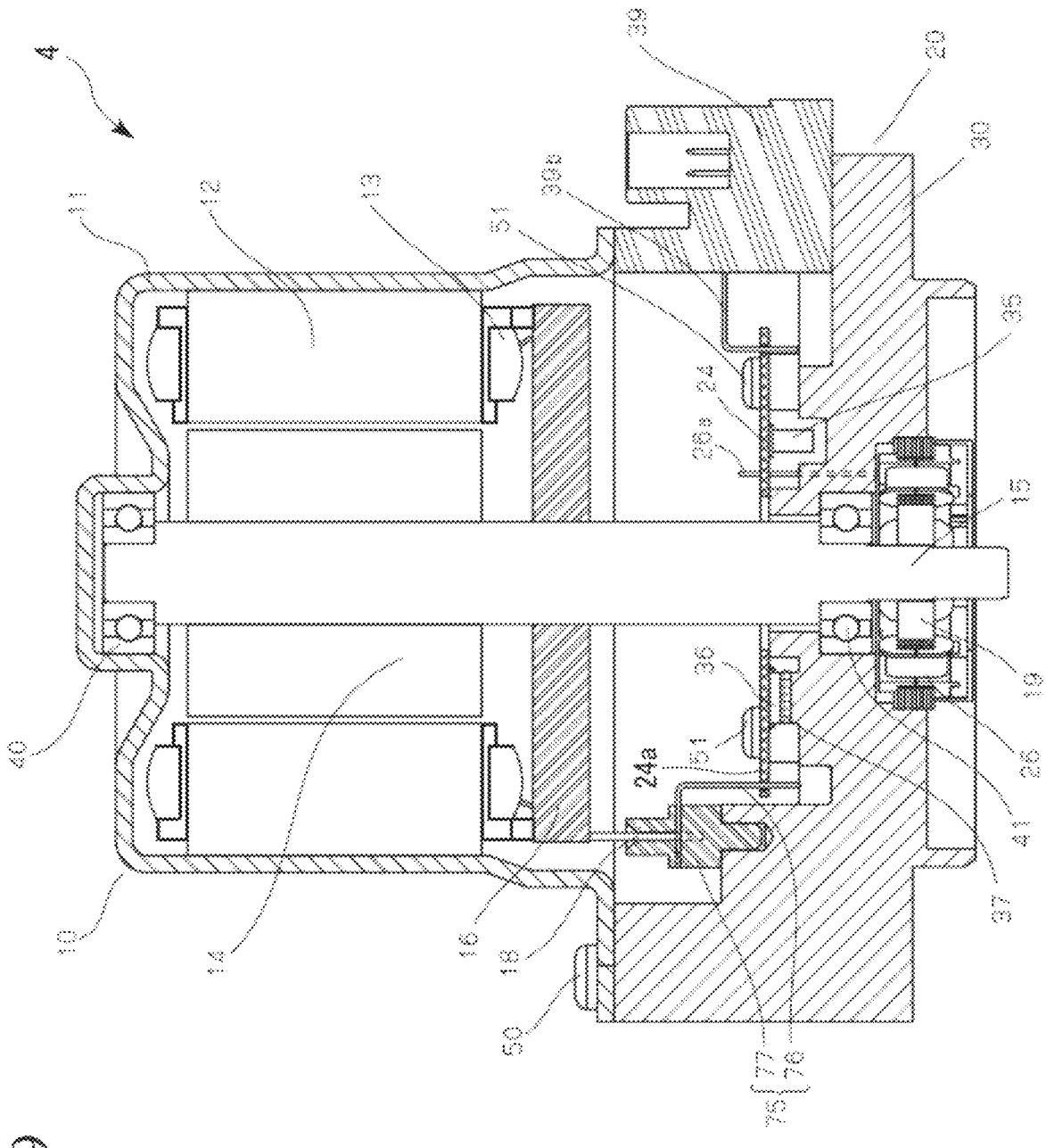
FIG. 9 is a cross-sectional view that shows a configuration of the electric motor control device according to a fourth embodiment.

Terminal connection structures of an electric motor control device according to a fourth embodiment are explained with reference to FIG. 9.

The fourth embodiment and the first embodiment are similar with regards to a method of fixing relay components to a unit case. The fourth embodiment and the first embodiment differ with regards to a disposition of the relay components, a substrate, and a connector, and a shape of the unit case. Points of difference between the first embodiment and the fourth embodiment are emphasized in the explanation below.

In an electric motor control device 4 according to the fourth embodiment, relay components 75 correspond to the relay components 60 explained in the first embodiment. A substrate 24 corresponds to the substrate 21 explained in the first embodiment. A unit case 30 corresponds to the unit case 27 explained in the first embodiment. A connector 39 corresponds to the connector 25 explained in the first embodiment. Connector connection parts 39b corresponds to the connector connection pans 25b explained in the first embodiment.

The relay components 75 are disposed between the substrate 24 and the motor 10. Relay terminals 76 face the motor 10. The relay terminals 76 face a first surface 24a of the substrate 24. The relay terminals 76 are connected to the substrate 24. The terminal connection structures of the motor terminals 18 and the relay terminals 76 are similar to the terminal connection structures of the first embodiment. The motor 10 faces relay connection parts that connect the substrate 24 and the relay terminals 76.

The substrate 24 has connection terminals that are connected to the relay terminals 76. The substrate 24 does not have substrate through holes through which the motor terminals 18 are inserted through. The motor terminals 18 are not inserted through the substrate 24. The connector connection parts 39b of the connector 39 are disposed between the substrate 24 and the motor 10. The connector connection parts 39h face the first surface 24a of the substrate 24. The connector connection parts 39b are connected to the substrate 24.

As a modified example of the fourth embodiment, the connector connection parts 39b of the connector 39 are made to extend from a unit case 30, and the connector connection parts 39b may be connected to the substrate 24.

With respect to the above, same or similar effects as the previously mentioned embodiments are obtainable according to the fourth embodiment. Since the motor terminals 18 are not inserted through the substrate 24, there is no need to form through holes in the substrate 24. For such a reason, a region to which components of the substrate 24 are mounted on increases. Since the relay components 75 are not disposed between the substrate 24 and the unit case 30, it is possible to downsize a structure of the unit case 30.

Fifth Embodiment

Figures 10, 11:
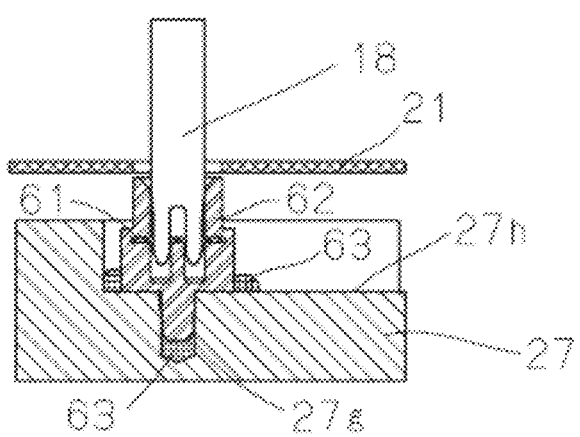
FIG. 10 is a cross-sectional view taken along the cross-section line X-X shown in FIG. 3, and is a view that schematically shows a configuration of the electric motor control device according to a fifth embodiment.
FIG. 11 is a plan view that shows integral type relay components in a state where the integrated type relay components are assembled to a unit case where the relay components and a connector are integrally formed, and is a view that shows a configuration of the electric motor control device according to a sixth embodiment.

Terminal connection structures of an electric motor control device according to a fifth embodiment are explained with reference to FIG. 10. FIG. 10 shows a portion in which the substrate 21, the motor terminals 18, the relay terminals 61, and the sockets 62 are provided. The shape of the substrate 21 and a shape of the unit case 27 are omitted in FIG. 10.

The fifth embodiment and the first embodiment are similar with regards to shapes and configurations of the unit case 27 and the relay components 60. The fifth embodiment and the first embodiment differ with regards to a method of fixing the relay components 60 to the unit case 27. Points of difference between the first embodiment and the fifth embodiment are emphasized in the explanation below.

As shown in FIG. 10, an adhesive 63 is first applied to the socket press-fit holes 27g and the socket seating surfaces 27h. The relay components 60 are press-inserted into the axial direction with respect to the unit case 27. The relay components 60 are fixed not only by press-fitting with respect to the unit case 27, but the relay components 60 are also fixed to the unit case 27 by the adhesive 63.

With respect to the above, same or similar effects as the previously mentioned embodiments are obtainable according to the fifth embodiment. Further, it is possible to further increase a strength of connection between the unit case 27 and the relay components 60. Even in a case where the strength of connection decreases due to an operating environment of the electric motor control device 1, it is possible to insure the strength of connection by the adhesive. For example, in a case where the temperature of the operating environment of the electric motor control device 1 decreases, the strength of connection in a press-fitted portion in between the unit case 27 and the relay components 60 decreases due to a difference of a coefficient of linear expansion that is due to the difference of constituent materials of the sockets 62 and the unit case 27. Even in such a case, it is possible to insure the strength of connection by using the adhesive.

Sixth Embodiment

Terminal connection structures of an electric motor control device according to a sixth embodiment are explained with reference to FIG. 11 and FIG. 12. Points of difference between the first embodiment and the sixth embodiment are emphasized in the explanation below.

An electric motor control device 6 according to the sixth embodiment includes integrated type relay components 70 that have the relay components 60 and the connector integrally formed. Similar to the first embodiment, the integrated type relay components 70 have the relay terminals 61.

Although a unit case 31 in the electric motor control device 6 partially corresponds to the unit case 27 explained in the first embodiment, the unit case 31 has a different configuration than the configuration of the unit case 27.

The integrated type relay components 70 for example, are fixed to the unit case 31 by screws 53.

Figure 12:
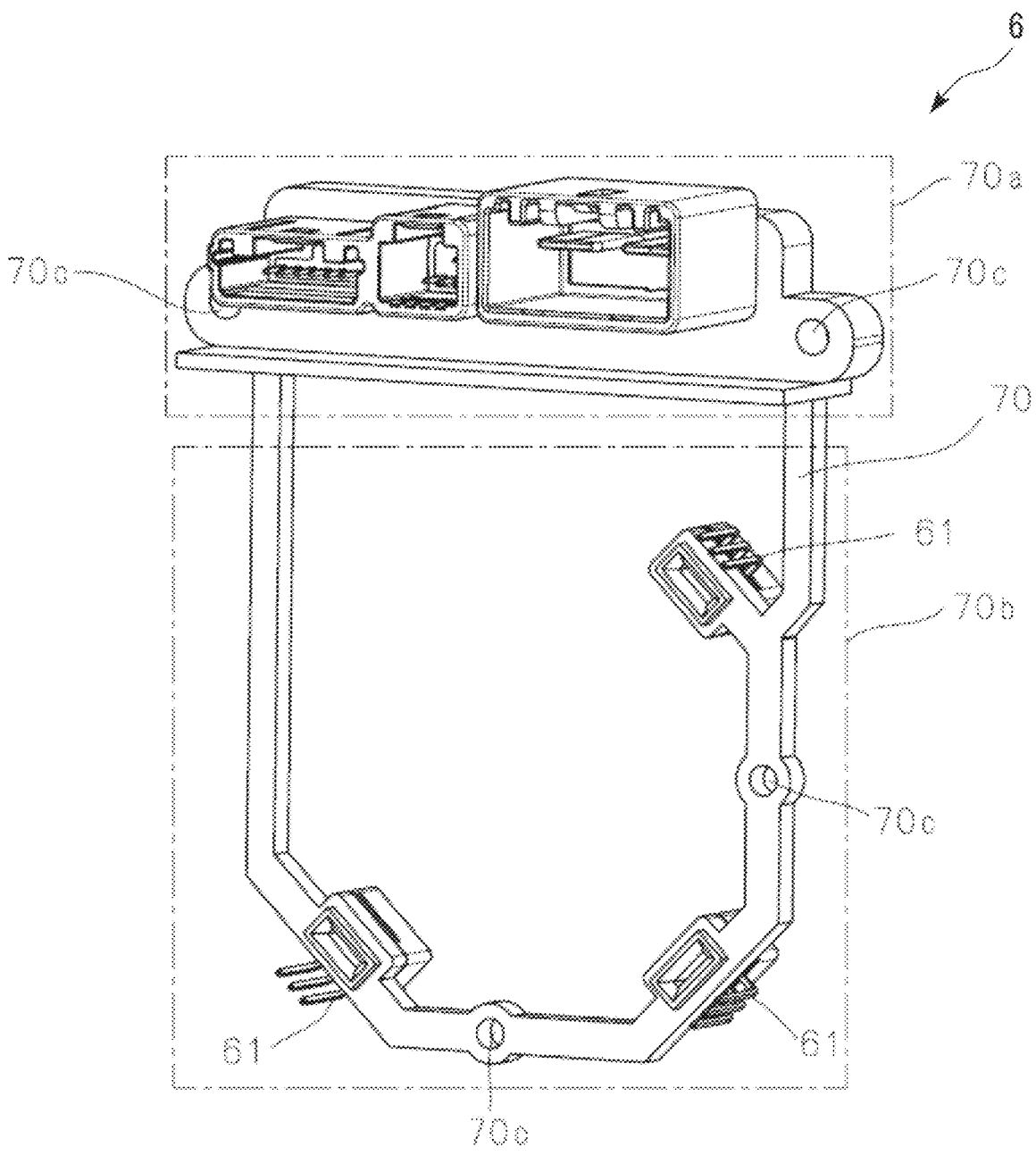
FIG. 12 is a perspective view that shows the integrated type relay components where the relay components and the connector are integrally formed, and is a view that shows a configuration of the electric motor control device according to the sixth embodiment.

As shown in FIG. 12, the integrated type relay components 70 have a connector portion 70a and a socket portion 70b. The connector portion 70a and the socket portion 70b are integrally formed. Three relay terminals 61 are integrally formed into the socket portion 70h. As examples of methods for integrally forming the relay terminals 61 and the socket portion 70*b*, an outsert molding method or an insert molding method may be mentioned. The socket portion 70*b* corresponds to the sockets 62 in the previously mentioned embodiments.

The socket portion 70*b* has through holes 71*c* through which screws are inserted. The unit case 31 differs from the first embodiment in that the unit case 31 has female thread parts 3*e* that fix the integrated type relay components 70. The unit case 31 and the integrated type relay components 70 are fixed to one another using a plurality of the screws 53.

It is possible to adopt any of the methods explained in the first or in the fifth embodiments previously mentioned as a fixing method of fixing the integrated type relay components 70 to the unit case 31.

Same or similar effects as the previously mentioned embodiments are obtainable according to the sixth embodiment. Since the integrated type relay components 70 where the connector and the sockets are integrally formed is used, it is possible to simplify a process of assembling the integrated type relay components 70 onto the unit case 31. The connector portion 70*a* and the socket portion 70*b* are fixed in several places in the integrated type relay components 70. For such reason, the integrated type relay components 70 is reliably fixed to the unit case 31.

The motor 10 that configures the electric motor control device 1 to 6 explained in the first to sixth embodiments previously mentioned has a configuration where the drive controller 20 is fixed to the output shaft of the motor 10. A structure where the drive controller 20 is fixed to the motor 10 on an opposite side of the output shaft may be adopted as modified example. Even in such a structure, as a connection structure of the motor terminals and the relay components, and a connection structure of the substrate and the relay components, it is possible to adopt a connection structure similar to the connection structure of the first to the sixth embodiments.

REFERENCE SIGNS LISTS

1, 2, 3, 4, 6 Electric Motor Control Device
10 Motor
18 Motor Terminals (Electric Motor Terminals)
20 Drive Control Device (Controller)
21 Substrate
25 Connector
27 Unit Case
60 Relay Components
61 Relay Terminal
62 Socket

The invention claimed is:

1. An electric motor control device, where the electric motor control device comprises:

an electric motor having a mechanical part and electric motor terminals that supply electric power to the mechanical part; and a controller that controls a drive of the electric motor, the controller having:

a unit case;

a circuit board substrate located between the electric motor and the unit case;

a connector that receives electric power and a signal input from an outside of the electric motor control device;

relay components that have relay terminals that connect the electric motor terminals and the electric circuit, and that transmit an electrical connection between the electric motor and the circuit board substrate, wherein, the unit case fixes the circuit board substrate, the connector, and the relay components, the motor terminals extend towards the controller from the electric motor, the motor terminals are connected to the relay terminals of the relay components, and the relay terminals extend to the circuit board.

2. The electric motor control device according to claim 1, wherein:

the circuit board substrate further comprises:

a power substrate that supplies electric power to the electric motor, a control substrate that controls the drive of the electric motor, and the relay terminals are connected to the power substrate.

3. The electric motor control device according to claim 1, wherein:

the relay components have sockets; and the sockets are fixed to the unit case at a location closer to the electric motor than to the circuit board substrate or in a location on an opposite side of the electric motor with respect to the circuit board substrate.

4. The electric motor control device according to claim 1, wherein:

the relay components have sockets, and the sockets are fixed to the unit case at least by one of:

a restoring force that is generated in the sockets, and an adhesion force of an adhesive material that is applied between the sockets and the unit case.

5. The electric motor control device according to claim 1, wherein:

the relay components have sockets, and the sockets and the connector are integrally formed.

6. The electric motor control device according to claim 1, wherein:

the electric motor has an output shaft, and the controller is disposed on the output shaft of the electric motor.

7. The electric motor control device according to claim 1, wherein:

the electric motor has an output shaft, and the controller is disposed on an opposite side of the output shaft of the electric motor.

* * * * *